March 26, 1929.  C. C. NEALE  1,706,539
ADVERTISING SCALE
Filed Dec. 29, 1924  2 Sheets-Sheet 1
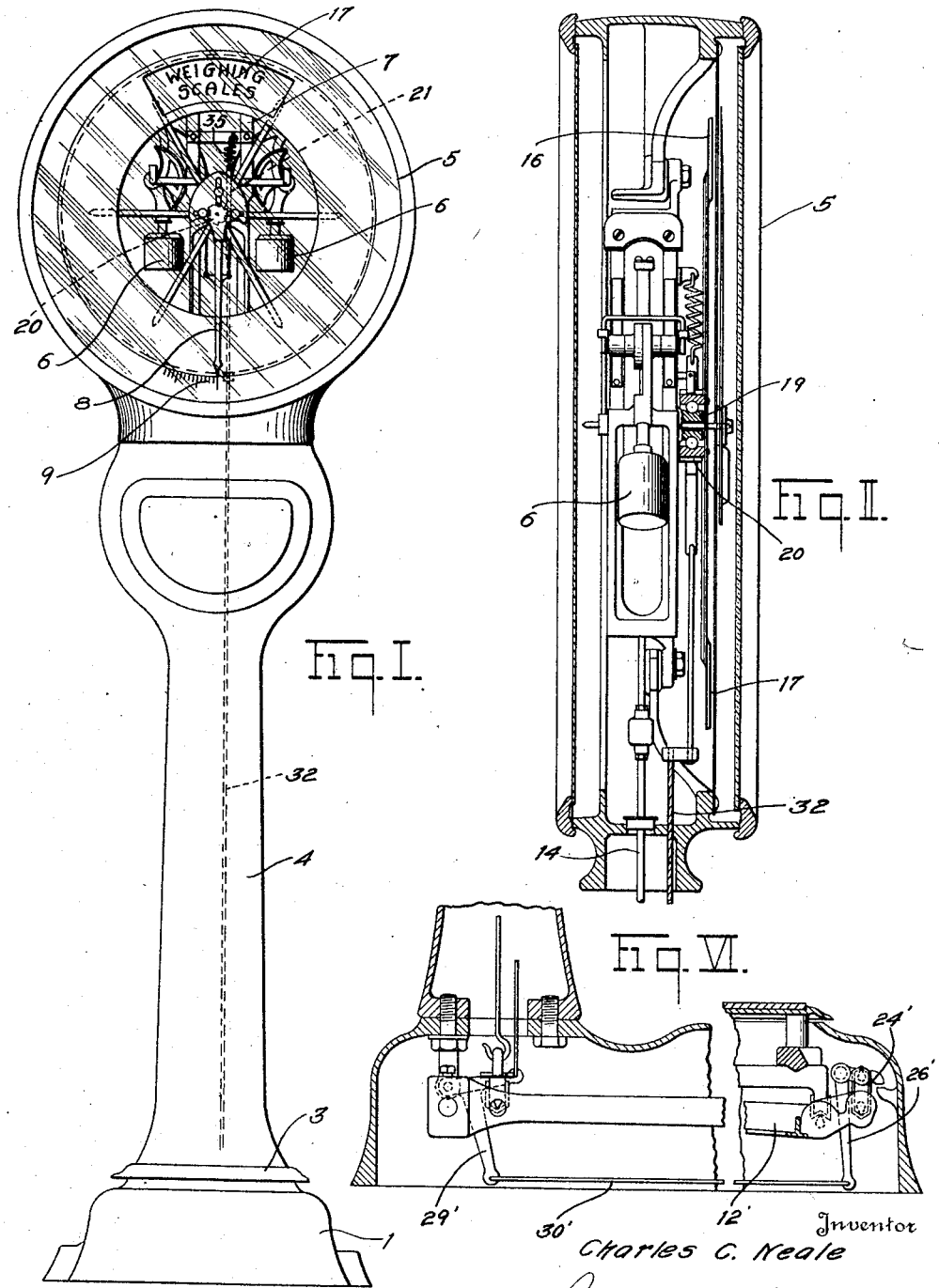

March 26, 1929.  C. C. NEALE  1,706,539
ADVERTISING SCALE
Filed Dec. 29, 1924    2 Sheets-Sheet 2
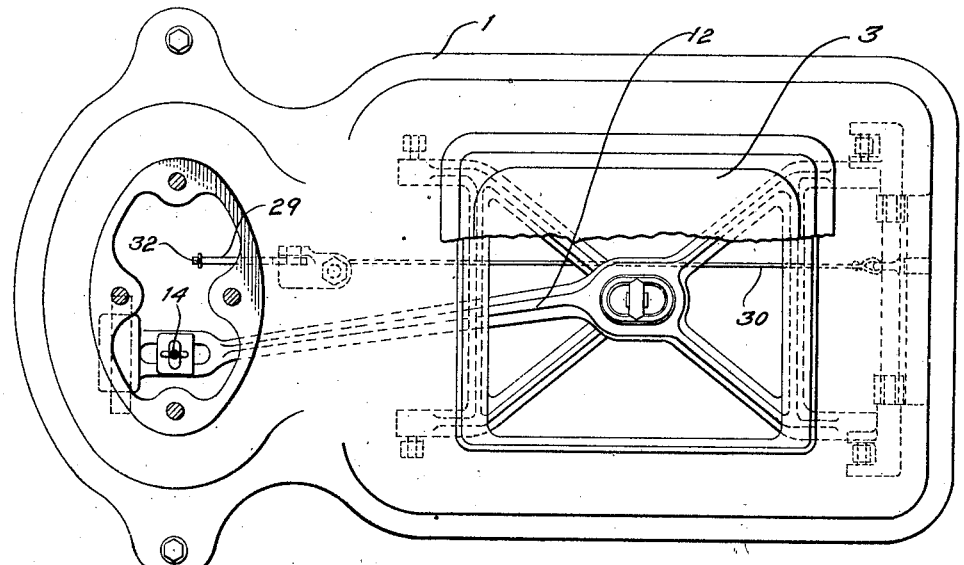
Fig. II.
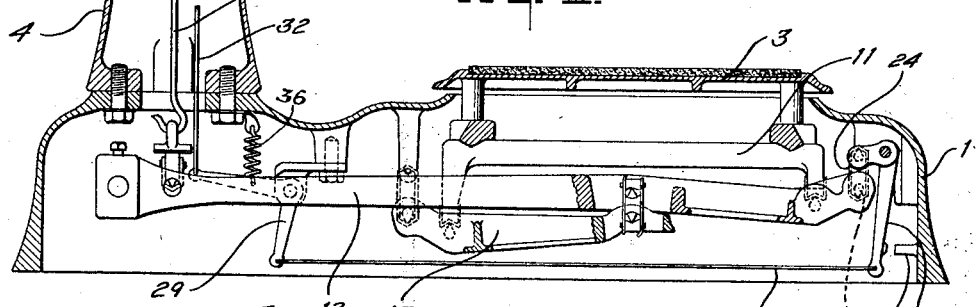
Fig. IV.
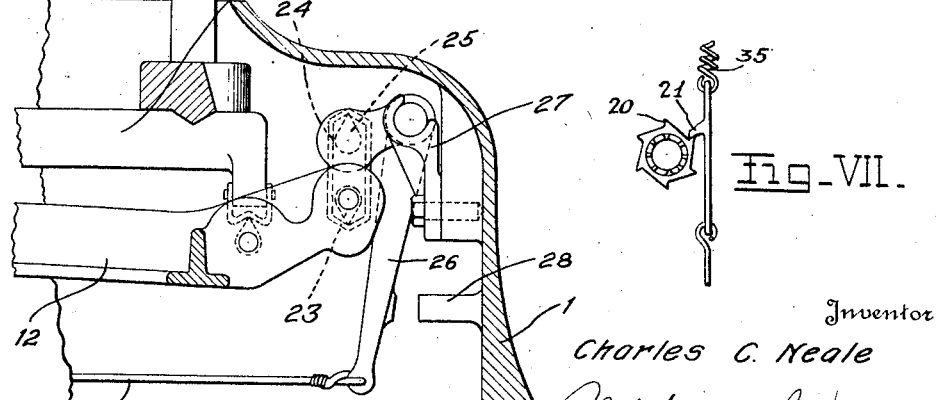
Fig. V.    Fig. VII.
Inventor
Charles C. Neale
By  Marshall
Attorney Patented Mar. 26, 1929.

1,706,539

UNITED STATES PATENT OFFICE.

CHARLES C. NEALE, OF TOLEDO, OHIO, ASSIGNOR TO TOLEDO SCALE COMPANY, OF TOLEDO, OHIO, A CORPORATION OF NEW JERSEY.

ADVERTISING SCALE.

Application filed December 29, 1924. Serial No. 758,572.

This invention relates to advertising devices forming a part of or auxiliary to other mechanism, and I have illustrated as a preferred embodiment thereof a weighing scale, to use with which the advertising mechanism of my invention is particularly adapted. It is to be understood, however, that the advertising device forming the principal feature of my invention is also adapted for use with other machines—for example, vending machines, amusement devices, etc., and I contemplate the use of this device wherever applicable.

One of the principal objects of this invention is to provide an advertising device operated as an auxiliary to a weighing scale or other machine in which the character of the advertising display is changed with each operation of the scale.

Another object is to provide an efficient and automatic device for changing the character of the advertising display.

Another object is the provision of an advertising device for use in conjunction with a weighing scale, the operation of which does not interefere with or affect in any way the operation of the weighing mechanism.

Other objects and advantages will be apparent from the following description, in which reference is had to the accompanying drawings illustrating preferred embodiments of my invention and wherein similar reference numerals designate similar parts throughout the several views.

In the drawings:—

Figure I is a front elevational view of a weighing scale embodying the device of my invention;

Figure II is an enlarged transverse sectional view through the casing supporting the load-counterbalancing mechanism and the advertising placards;

Figure III is an enlarged top plan view of the base of the scale showing the arrangement of parts therein;

Figure IV is a sectional view through the base showing the operating mechanism for the advertising device;

Figure V is an enlarged fragmentary sectional view through a portion of the base showing certain elements of my device; and Figure VI is a fragmentary sectional view through the base showing a modified form of the means for operating the advertising device.

Figure VII is a fragmentary detail view showing a toothed wheel and pawl and adjacent parts forming a part of the device of my invention.

Referring to the drawings in detail, I have shown the device of my invention as embodied in a weighing scale of the type known as a person weigher, to which, because of its advertising nature, my device is particularly well adapted. My invention does not reside in the weighing mechanism per se, and so the scale will only be described with such particularity as will suffice to clearly show the connection of the other elements of my invention therewith.

As illustrated, the scale proper consists of a base 1 housing and supporting lever mechanism which supports a platform 3 of comparatively small area so that several persons cannot stand upon the scale at the same time. Secured to the base 1 and extending upwardly from the rear end thereof is a hollow column 4 surmounted by a watch-case-shaped casing 5 within which is supported the automatic load-counterbalancing and indicating mechanism.

The load-counterbalancing mechanism illustrated is of substantially the automatic pendulum type described and claimed in the United States patent to Hapgood No. 1,203,611, dated November 7, 1916. It consists substantially of a pair of oppositely swinging pendulums 6 supported upon an upright frame 7 and adapted to swing upwardly and outwardly to offset the load on the scale platform. The pendulum mechanism is suitably connected by means of rack and pinion mechanism (not shown) to an indicator hand 8 which is adapted to co-operate with a chart 9 to indicate the weight of the load.

The platform is carried by a spider 11 which is supported upon the long and short levers 12 and 13 respectively of the lever mechanism, the long lever being suitably connected by means of a link 14 to the pendulum load-counterbalancing mechanism.

The advertising device consists of a disklike annulus 16 suitably adapted to support a series of advertising placards 17, the annulus 16 being rotatably supported upon antifriction bearings 18 carried by an integral member 19 of the frame 7. Any suitable means may be employed for rotating the advertising device to change the character of the display, that shown comprising a toothed wheel 20 and a detent or pawl 21 actuated upon movement of the scale platform in a manner to be hereinafter described.

The fulcrum pivot 23 of the long lever 12 is suspended by means of a link 24 from a pivot 25 carried by the short arm of a bell crank lever 26. The bell crank lever is journaled in a bracket 27 fixedly secured to the base by screws or other suitable fastening means. The lower extremity of the long arm of the lever 26 is connected to an arm of another bell crank lever 29 by means of a cable 30, the lever 29 being suitable connected by a cable 32 to the pawl 21. A stop 28 on the base is adapted to limit the relative movement of the levers 12 and 26 and associated mechanism so that further downward movement of the platform will actuate the weighing mechanism.

In the operation of the device a person desiring to be weighed steps upon the platform 3, depressing same, and through the medium of levers 12 and 13 and link 14 causes the pendulums to swing to a load-counterbalancing position and the indicator 8 to move to a position indicating the weight of the person upon the chart 9. Simultaneous with the movements of the weighing mechanism the lever 12 suspended from the movable member 26 is caused to move downwardly until the long arm of the bell crank lever 26 engages the stop 28 on the base and prevents further relative movement of the lever 12. This movement, however, is sufficient to move the cables 30 and 32, lever 29 and pawl 21 to rotate the advertising display through one-sixth of a revolution— i. e., if such device is provided with six placards, thus moving a placard of a different character into prominence at each weighing. After the weighing has been effected and the person steps from the scale platform, the weighing mechanism per se returns to normal position, and the mechanism for operating the advertising device is returned to normal position under the retractile force of the springs 35 and 36.

It will be apparent from the foregoing description that a changing of the advertising display is effected with each weighing operation of the scale.

In the modified form of the device shown in Figure VI the main lever 12' is supported at its fulcrum by means of a link 24' suspended from the short arm of a bell crank lever 26', the long arm of the lever being connected by a rod 30' to one arm of another bell crank lever 29'. The lever 29' is operatively connected to the advertising display means in the manner hereinbefore described.

The operation of this form of device is similar to that of the preferred form, the member 30' being in compression, however, when a load is placed upon the scale platform.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in combination, weighing mechanism including a pair of weighing levers, one of said levers having a relatively movable fulcrum, means for limiting the movement of said movable fulcrum, a movable advertising device, and means connected with said movable fulcrum for actuating said advertising device.

2. In a device of the class described, in combination, weighing mechanism including a weighing lever, said lever having a relatively movable fulcrum, a stop for limiting the relative movement of said lever fulcrum, adjunctive mechanism, and means co-operating with said relatively movable lever fulcrum for operating said adjunctive mechanism.

3. In a device of the class described, in combination, weighing mechanism including a weighing lever, a bell crank lever, said weighing lever being fulcrumed upon said bell crank lever, a stop for limiting the movement of said bell crank lever, an advertising device, and means co-operating with said bell crank lever for operating said advertising device.

CHARLES C. NEALE.